Jan. 10, 1967 R. P. OGDEN 3,297,455
METHOD OF FREEZE DRYING LIQUID MILK PRODUCTS
Filed Oct. 22, 1965
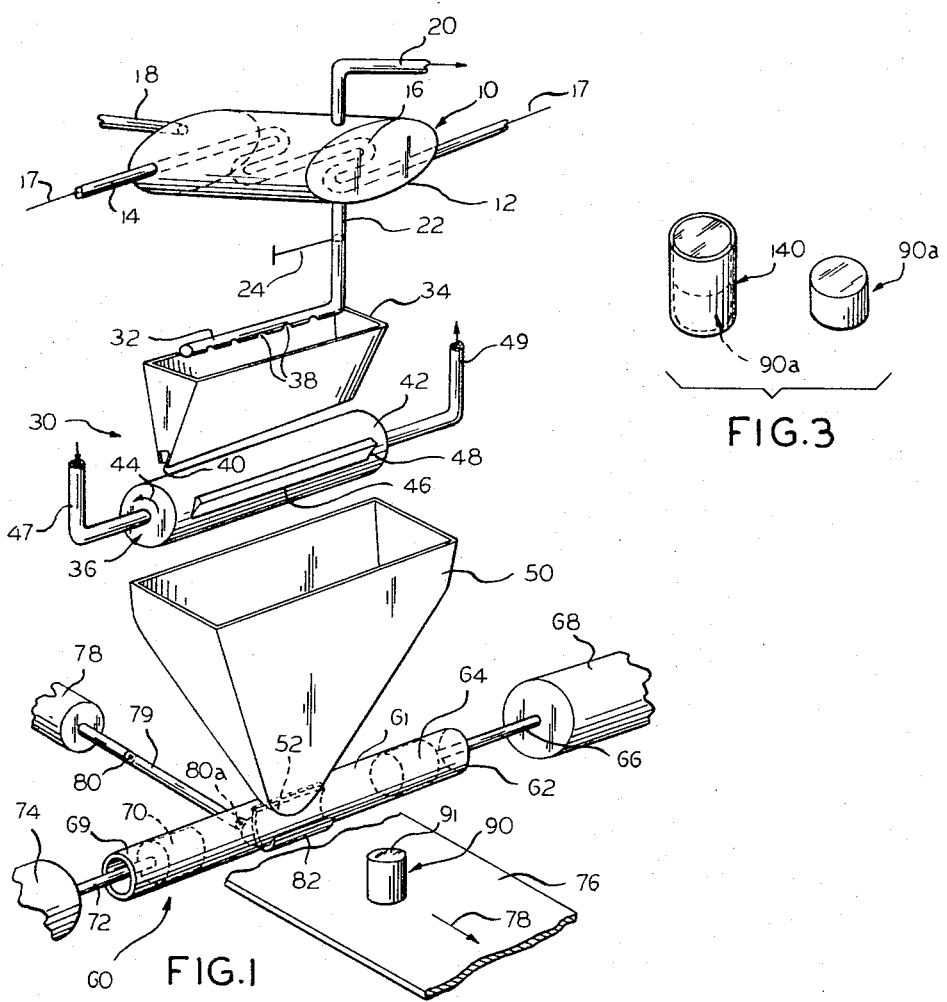
FIG.3
FIG.1
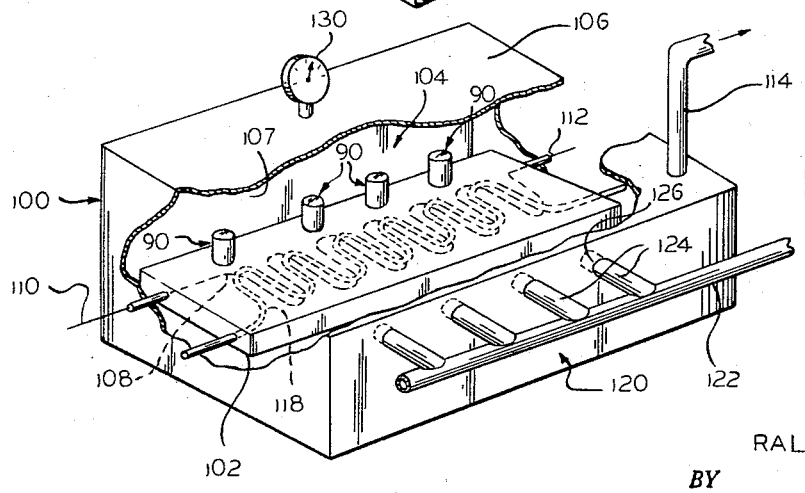
FIG.2
INVENTOR.
RALPH P. OGDEN
BY
Mann, Brown & McWilliams
ATTORNEYS

United States Patent Office 3,297,455
Patented Jan. 10, 1967

3,297,455
METHOD OF FREEZE DRYING LIQUID MILK PRODUCTS
Ralph P. Ogden, 7522 Walnut St., Hammond, Ind. 46324
Filed Oct. 22, 1965, Ser. No. 507,623
9 Claims. (Cl. 99—201)

This application is a continuation-in-part of my now abandoned copending application Serial No. 167,694, filed January 22, 1962.

My invention relates to a method of freezing liquid products. The term "liquid product" as used herein includes slurries, emulsions, solutions, and mixtures which are susceptible to the method of the invention. The invention will be exemplified as applied to thoroughly mixed fresh whole milk or to homogenized fresh whole milk to produce on an economical basis a dried milk product that in its reconstituted form is fully as palatable as the original.

At the present time the producing and marketing of milk is closely tied in geographically with the location of its market area because of the high water content in milk and the consequent critical requirements for refrigeration, which prevent it from being shipped long distances as a fresh product. While concentrated and dehydrated milk are marketed to a limited extent, whole fresh milk continues to be the form primarily demanded by the ultimate consumer.

There have been many efforts to dehydrate milk to a highly concentrated or dried form for facilitating its packaging and merchandising, but insofar as I am aware, no practical way has been found to eliminate the unpalatableness of concentrated or dried milk. Concentrated or dried milk when reconstituted by adding water substitutes quite well nutritionally for the fresh product, but the taste is entirely different and usually considered unpalatable.

Consequently, as a practical matter the uses of concentrated or dried milk have been confined to instances in which the taste of the concentrated or dried milk is sufficiently obliterated to avoid objection from this standpoint.

The change in taste of milk as it is dehydrated and dried can be caused by a number of factors, though it is usually attributable to some carmelization of the milk sugars during the dehydrating and drying processes.

The prior art in the field has long recognized the unpalatableness of concentrated or dried milk after reconstitution, and many attempts have been made to overcome this problem by employing ways and means to reduce the temperatures required to sterilize and concentrate the end product. Generally speaking, these attempts involve the use of complicated de-icing and related techniques to remove water from the milk (see, for instance, Patents Nos. 2,248,634 and 2,343,169), and, if complete drying is desired, a spray drying procedure has been employed which necessarily requires involved collection procedures for gathering the resulting particles for packaging purposes; see, for instance, Reissue Patent 24,080 and Patent 2,011,558.

An early variation in this approach is shown in Patent 523,677, in accordance with which the product is first concentrated by freezing out water, then frozen in a thin layer to sterilize it, then flaked off the freezing surface and thawed, after which it is dried as a liquid under vacuum conditions, then molded into cakes that are again flaked or formed into shavings which are subsequently completely dried by contact with warm dry carbonic gas, and then powdered, after which, of course, some collection procedure must be provided for packaging the product.

In contrast, my invention takes an entirely new approach. My new process contemplates that the fresh product be first dehydrated by employing conventional procedures to approximately one-third of its volume, after which the resulting concentrate is quickly frozen into a thin sheet that is immediately fragmented into flakes or chips. The resulting frozen flakes or chips are then compacted into a cake or block which is then fully dried under vacuum conditions while maintained fully frozen to provide the finished product.

The resulting cake or block is then applied to a suitable container which preferably is proportioned to receive several of the cakes or blocks. The packaged end product is thus capable of being merchandised without further handling, and I contemplate that the container used for packaging purposes may be employed by the ultimate consumer to reconstitute the dried milk product to the dilution desired. Vacuum or inert gas packing (both well known in the art) can be used. The dried cakes could be pulverized where it was desirable to market a powdered product.

There are a number of important advantages arising from the practice of my method. In the first place, it will be found that the reconstituted product is fully as palatable as the original fresh product, and this, of course, is of critical importance in this art.

Furthermore, the milk product is handled as a solid cake or block during the critical drying and packaging processes or procedures, which eliminates the need for complex particle gathering techniques and materially simplifies the problem of insuring appropriate purification standards.

Therefore, a principal object of my invention is to provide a method of dehydrating milk which eliminates the taste loss problems of prior practices.

Another important object of the invention is to provide a method of dehydrating milk in which the milk is dried after being changed to its solid state.

A further important object of this invention is to materially simplify and facilitate milk dehydrating procedures.

Other objects of my invention are to provide a simple and economical method and apparatus for providing a dried milk product; to provide a dried milk product in a shape which lends itself to ready merchandising procedures and use by the ultimate consumer; and to provide a milk drying arrangement which is economical of manufacture, convenient to install, and useable in connection with the drying of a wide variety of grades of milk and milk-like products.

Other objects, uses and advantages will become obvious or be apparent from a consideration of the application drawing and the following detailed description.

In the drawing:

FIGURE 1 is a diagrammatic perspective view illustrating largely in block diagram form several of the apparatus components that may be employed in practicing my invention, arranged to bring out the relation in consecutive order of the initial steps of my method;

FIGURE 2 is a diagrammatic perspective view, with parts broken away to facilitate illustration, showing the manner in which the drying steps of my method may be performed; and FIGURE 3 is a composite diagrammatic perspective view illustrating more particularly one preferred form of the dried milk product and a suitable merchandising container therefor.

However, it should be distinctly understood that the drawing illustrations are provided primarily to comply with the requirements of 35 U.S.C. 112, and that those skilled in the art will readily be able to practice my method using other appropriate apparatus components, and make modifications in the procedures involved, without departing from the scope of the invention.

To begin with, I deem it appropriate to call my method a method of freeze drying milk since the actual milk drying procedures are performed when the milk itself is frozen.

In practicing my milk freeze dry method, fresh whole milk (or homogenized fresh whole milk) is first dehydrated or concentrated to approximately one-half to one-fourth, say one-third, its original volume by employing conventional practices and procedures that avoid carmelization of milk sugars. For this purpose, a conventional low temperature vacuum distillation autoclave or drying vessel unit may be employed for both dehydration and sterilizing purposes, and such a unit is generally indicated at 10 in FIGURE 1. The autoclave illustrated is shown as including a suitable container 12 which is heated by electrical heating coil portion 16 (connected to a source of electrical power by leads 17) within the tank 12, with the raw milk product being supplied through a suitable inlet 18 and moisture being drawn off through a suitable conduit 20 by employing an appropriate blower or other conventional apparatus customarily employed for this purpose.

When the milk within the autoclave 10 has been brought to approximately the concentration indicated, it is discharged through outlet conduit 22 by operating suitable valve 24, whereupon the concentrated liquid proceeds to suitable apparatus for freezing it in accordance with my method.

A suitable freezing apparatus is diagrammatically indicated at 30 in FIGURE 1, wherein it will be seen that the liquid passes from conduit 22 into an elongate discharge conduit 32 that is, horizontally disposed above an elongate funnel-shaped member 34 positioned directly above a rotatably mounted refrigerated cylinder or drum 36. The liquid discharges from discharge conduit 32 through suitable openings 38 into and through the elongate funnel-shaped member 34, which is formed with a narrow elongate outlet opening 40 that extends parallel to the longitudinal axis of cylinder or drum 36 and immediately above same. The liquid passes through the opening 40 in a thin film and directly onto the exterior surface or periphery 42 of drum 36, and drum 36 is refrigerated sufficiently to immediately freeze (flash freeze, as it is known in the art) the liquid into a thin film, or film like sheet, extending lengthwise of the periphery 42 (parenthetically, it is here pointed out that if milk is not rapidly frozen, its fat particles will come out of emulsification, which would detract from the palatability of the end product; consequently, the milk concentrate must be frozen within a time adequate to prevent the fat particles from coming out of emulsification, which time is well known to those skilled in the art). The cylinder or drum 36 is rotated in the direction indicated by arrow 44, which applies the now frozen milk film against the elongate knife edge 46 of a doctor blade 48 mounted in any suitable manner with its said edge 46 applied in abutting relation with the periphery 42 of the cylinder or drum 36.

This breaks or fragments the frozen milk film into chips or flakes which then drop under the action of gravity into a funnel 50 that readies the product for the next step in my process. The fragmenting of the film may be insured by applying a suitable comminuting arrangement in funnel 50.

It may be mentioned at this point that the refrigerated drum or cylinder 36 may be of any conventional type and this type of apparatus is well known commercially and in the prior art. Of course, the drum or cylinder 36 may be mounted for rotation in any suitable manner (not illustrated) and it may be refrigerated in any suitable manner. Conduits 47 and 49 are intended to represent any convenient way of getting the refrigerant to and from an appropriate refrigerating system.

The frozen milk chips or flakes that fall into a funnel 50 then drop through the lower open end 52 of the funnel to appropriate apparatus or means for compacting these chips or flakes into a cake or block of suitable configuration consistent with the objects of my invention.

In the showing of FIGURE 1, an appropriate cake or block forming apparatus is generally indicated at 60, and is shown as comprising a tubular forming cylinder 61 having reciprocably mounted in one end 62 thereof an appropriate compacting piston 64 that is actuated through an appropriate piston rod 66 by double acting cylinder 68 that may be hydraulically or pneumatically controlled.

Reciprocably mounted in the other end 69 of the cylinder 61 is an ejecting piston 70 which is operated through an appropriate piston rod 72 by an appropriate type of double acting cylinder 74 that also may be hydraulically or pneumatically controlled.

The cylinder 61 and the apparatus 68 and 74 are mounted in any suitable manner to position the cylinder 61 above a suitable conveyor element 76 that may move in the direction indicated by arrow 78. The conveyor element 76 may be a suitable form of endless belt appropriately trained in the manner well known to the conveyor art.

The undersurface of the tubular cylinder 61 preferably includes a movable or gate section 82 that may be moved between the open and closed positions indicated as by employing hydraulically or pneumatically operated cylinder 78 with link 79 being connected between the two by pins 80 and 80a.

The milk flakes or chips leaving the funnel member 50 drop through the funnel opening 52 into the tubular cylinder 61 onto the movable gate section 82, and after an appropriate pile is formed, the piston 64 is actuated to move such pile against piston 70, which is held against movement, and this compacts the flakes or chips together. This process may be repeated as required to pack the flakes or chips into a cake having a configuration complementing the bore of cylinder 61, and after the resulting cake or block achieves the desired size, the movable section 82 is lowered to open the underside of cylinder 61 and the piston 70 is moved to eject the resulting cake through such opening onto belt 76.

The resulting cake is generally indicated at 90 in the lower portion of FIGURE 1, and after being applied to belt 76, the cakes 90 may be conveyed to a suitable gathering point for application to a drying apparatus equivalent to that generally indicated by reference numeral 100 of FIGURE 2.

In the showing of FIGURE 2, the apparatus 100 is illustrated as comprising a suitable plate-like structure 102 that is horizontally disposed within the vacuum chamber 104 defined by an airtight housing 106, which, of course, is provided with a suitable removable side or door 107 for inserting the cakes 90 within the apparatus 100. The plate structure 102 is mounted within the housing 106 in any suitable manner and, in the form illustrated, it is heated by electrical resistance element 108 that is connected with an appropriate source of power by appropriate leads 110 and 112 (though other suitable sources of heat may be used instead). The vacuum chamber 104 is connected to a suitable source of vacuum through an appropriate conduit 114 to maintain vacuum conditions within chamber 104 at one millimeter of mercury or less.

The drying step of my method is practiced by placing a plurality of cakes 90 on the plate structure 102, as by disposing them on one of their flat ends 91, shutting the door 107 of the housing 106 and taking the usual precautions to seal off vacuum chamber 104, after which the source of vacuum is applied to reduce the pressure within the vacuum chamber 104 to the amount indicated. It is preferable that the plate structure be sufficiently cooled to avoid melting of the cakes 90 when they are placed in the positions indicated in FIGURE 2 and for this purpose, the vacuum chamber 104 may be provided with some means of refrigeration, appropriate cooling coil 118 shown applied to plate structure 102 for illustrative purposes.

After the vacuum chamber 104 reaches the desired conditions of operating vacuum, the plate structure 102 is heated to a temperature on the order of 90 degrees F. to drive off the moisture in the respective cakes 90. At this point it should be made clear that the only requirements as far as heating temperature is concerned is that the heat supplied not be such that the temperature of the frozen portion of the drying cake be raised above its melting point. Actually, what should be done is that only that amount of heat should be supplied to the individual cakes which will cause the moisture to leave the frozen undried portions of the cakes without melting them. In other words, the individual cakes should be dried solely by the process of sublimation.

During the drying procedure, it is preferable to provide some means of eliminating moisture from the vacuum chamber 104, such as the source of vacuum connected to conduit 114, or instead for this purpose, a steam jet molecule exhaust system generally indicated by reference numeral 120 has been illustrated in connection with the apparatus 100 employing a conduit 122 through which a high speed steam jet travels, and which has connected thereto spaced tubular extensions 124 which have their inner ends 126 disposed inside vacuum chamber 104. The steam jet exhaust system illustrated is intended to represent any appropriate type of this form of evacuation system that may be employed for evacuating enclosed spaces and there are many types commercially available.

Alternately, the moisture leaving the individual cakes 90 may be removed by an appropriate form of condensing system employing any well known form of refrigeration system in connection with the chamber 104, as will be obvious to those skilled in the art. This method of moisture removal would not eliminate the need for a source of vacuum.

The chamber 104 should be provided with an appropriate type of pressure gauge 130 and it will be found that the completion of the drying step will be indicated by a commencing of a pressure drop in chamber 104. The drying apparatus 100 may then be shut down and the cakes 90 removed for packaging in any appropriate manner.

The degree of dryness to be achieved by the practice of my method should be such that the residual moisture remaining in cakes 90 should be something on the order of 0.5 percent to 5 percent of the matter remaining as a cake 90, and this dryness may be achieved by adopting any suitable cycling procedures as to time, etc. The term "fully dried" or its equivalent as used in the appended claims includes dryness of the standard indicated.

It will be found that the product dried to the standard indicated holds together well due to its high protein content and that there is very little change in dimension from the size it is in when it emerges from the compacting cylinder 61.

I prefer that the dried product, which is indicated at 90a in FIGURE 3 (to distinguish it from the frozen product of FIGURE 1), be packaged in a container 140 (see FIGURE 3) that has a shape generally complementing the shape of the product 90a. Preferably, the container 140 is proportioned to hold several of the cakes 90a, and in the showing of FIGURE 3, the container 140 is a cylindrical commercial can of any appropriate make.

Thus, when the ultimate user opens a container 140, he may remove the cakes 90a that are not required and leave a single cake 90a within the can for reconstituting purposes. It will be seen that the reconstitution to milk may be to any desired dilution, and the can 140 may be provided with suitable measuring indicia to facilitate this process. Alternately, the cake to be reconstituted may be applied to another container, and the container 140 be used to supply the requisite or desired amount of water, for instance a multiple of three times the size of the cake.

After the reconstituted milk has been emptied from the container 140, it may be cleaned and wiped dry and have the remaining cakes reapplied thereto for further storage until needed.

Probably the most important aspect of this method is that the reconstituted milk is just as palatable as the fresh product. Futhermore, the cake 90a reconstitutes without foaming and with very little of the problem that is associated with trying to reconstitute powdered milks.

It will therefore be seen that my method of freeze drying milk contemplates the dehydration of the fresh product to approximately one-third of its original volume, and then rapidly freezing the product into, for instance, thin sheets which are fragmented into chips or flakes that are compressed into cakes. The cakes are then supplied with heat under high vacuum conditions to completely dry them to the standard indicated, after which the cakes may be packaged in containers of complementary shape.

It will be immediately apparent that the apparatus that may be employed for accomplishing the steps of the method outlined in connection with the showing of FIGURES 1–3 may be varied to suit conditions and technical requirements, though the temperature and pressure conditions indicated are considered critical in accomplishing the elimination of the taste problem, and since the milk must be rapidly frozen to keep the fat particles from coming out of emulsification, the freezing of same into the equivalent of thin sheets or layers that are later fragmented is an essential step of the method.

The cakes into which the frozen milk chips or flakes are formed may take any convenient shape, although preferably such shape should employ at least one flat surface 91 for good thermal contact with a heating plate arrangement equivalent to plate structure 102. For instance, the cakes 90 may be parallelepiped in configuration, and the parallelepiped configuration and the cylindrical configuration illustrated are preferred because they lend themselves so readily to packaging and merchandising purposes.

It will also be seen that my method has a number of important advantages in addition to elimination of the taste problem. For instance, the dilution of the reconstituted product is readily controlled to provide as rich or as thin a liquid as may be desired.

Furthermore, freeze dry products absorb moisture much more readily than powdered products, with the result that the reconstituted liquid is achieved without lumps and bubbles as soon as the desired amount of liquid has been thoroughly mixed with the dried cake product.

It is important to note that the critical drying and packaging steps of this invention are performed when the product is in the form of a solid cake. This permits efficient supplying of low cost heat by conduction and eliminates the well-known gathering and dispensing problems associated with powdered products and materially reduces the sanitation problems normally associated with the manufacture of food products.

The method of my invention may be employed to process not only milk but other milk-like products such as coffee cream, chocolate milk or drink, coffee cream substitutes, egg nog, and skim milk (or powdered skim milk and water) plus emulsified added oil or fat, e.g., palm oil, coconut oil, peanut oil, cottonseed oil, and sweet butter. Obviously, milks other than cows' milk, such as mothers' milk and goat milk could be processed by this method. The method of this invention could be useful with many products where a very fast "flash" freeze in a thin layer (e.g. to avoid emulsion breakdown or other separation of the constituents) plus efficient freeze drying in cake form by low cost conducted heat would be helpful. Possible examples would be biologicals (such as plasma), vegetable and fruit juices, slurries (such as banana slurry), mashed potatoes with the milk already in, and rubber tree sap (which is an emulsion), and soups.

The foregoing description and the drawings are given merely to explain and illustrate my invention and the invention is not to be limited thereto, except insofar as the

I claim:

1. The method of freeze drying a liquid milk product which includes concentrating the product to a volume in the range of ½ to ¼ of its original volume, flash freezing the concentrate into a film, forming the film into chips, compacting the chips into cakes, and drying the cakes under conditions of temperature and pressure that preclude melting of the cakes to a final moisture content that does not exceed approximately 5 percent.

2. The method of claim 1 wherein said cakes are each formed with flat bottom surfaces, and wherein said cakes are dried by placing said surfaces in engagement with a flat heating plate structure.

3. The method of freeze drying a liquid milk product containing solids in suspension which includes concentrating the product to a volume in the range of ½ to ¼ of its original volume, flash freezing the resulting concentrate into a solid film, fragmenting the film, forming the film fragments into a cake, and drying the cake solely by sublimation under vacuum conditions approximating at least one millimeter of mercury to a final moisture content that does not exceed approximately 5 percent.

4. The method of freeze drying milk which includes reducing the water content of fresh milk to concentrate the milk to a volume on the order of ⅓ of its original volume, flash freezing the resulting milk concentrate into a film, fragmenting the film, forming film fragments into flat bottom cakes, and drying the cakes under conditions of temperature and pressure that preclude melting of the cakes to a final moisture content that does not exceed approximately 5 percent.

5. The method of freeze drying milk which includes concentrating the milk to a volume on the order of ⅓ of its original volume, flash freezing the resulting milk concentrate into a film, fragmenting the film, forming the film fragments into flat bottom cakes, and drying the cakes under conditions of temperature and pressure that preclude melting of the cakes to a final moisture content that does not exceed approximately 5 percent.

6. The method set forth in claim 5 wherein the cakes are packaged several to a reconstituting container.

7. The method of freeze drying milk which includes concentrating the milk to a volume in the range of ½ to ¼ of its original volume under conditions of temperature and pressure that preclude carmelization of the milk sugars, flash freezing the concentrate into a film, forming the film into chips, compacting the chips into cakes, and drying the cakes under conditions of temperature and pressure that preclude melting of the cakes to a final moisture content that does not exceed approximately 5 percent.

8. The method of claim 7 wherein said cakes are each formed with flat bottom surfaces, and wherein said cakes are dried by placing said surfaces in engagement with a flat heating plate structure.

9. The method of freeze drying milk which includes concentrating the milk to a volume in the range of ½ to ¼ of its original volume, flash freezing the resulting milk concentrate into a solid film, fragmenting the film, forming the film fragments into a cake, and drying the cake solely by sublimation under vacuum conditions approximating at least one millimeter of mercury to a final moisture content that does not exceed approximately 5 percent.

References Cited by the Examiner

FOREIGN PATENTS 549,606   12/1957   Canada.

OTHER REFERENCES

Von Loesecke, H. W.: "Drying and Dehydration of Foods," 2nd ed., 1955, Reinhold Pub. Co., New York, page 153.

A. LOUIS MONACELL, *Primary Examiner.*

M. W. GREENSTEIN, *Assistant Examiner.*